United States Patent
Estes et al.

(10) Patent No.: US 6,850,777 B1
(45) Date of Patent: Feb. 1, 2005

(54) METHOD FOR PROVIDING A PERSONAL IDENTIFICATION NUMBER TO A SUBSCRIBER IDENTITY MODULE

(75) Inventors: Charles D. Estes, Fort Lauderdale, FL (US); Josue Pena, Miami, FL (US); Robert H. Pichette, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/539,389

(22) Filed: Mar. 31, 2000

(51) Int. Cl.[7] .................................................. H04B 1/38
(52) U.S. Cl. ....................................... 455/558; 455/411
(58) Field of Search ................................. 455/425, 558, 455/410, 411, 556, 186.1, 418, 183.2; 705/72, 41, 44, 67; 713/182, 183, 184, 200, 201, 202, 161; 380/264

(56) References Cited

U.S. PATENT DOCUMENTS

| | | | | |
|---|---|---|---|---|
| 5,404,580 A | 4/1995 | Simpson et al. | ............... | 455/89 |
| 5,668,875 A | 9/1997 | Brown et al. | .................. | 380/23 |
| 5,815,570 A | 9/1998 | Hannon et al. | ............. | 379/428 |
| 5,907,804 A | * 5/1999 | Schroderus et al. | ........ | 455/411 |
| 5,937,068 A | * 8/1999 | Audebert | ...................... | 713/185 |
| 5,999,811 A | 12/1999 | Molne | ......................... | 455/432 |
| 6,067,351 A | * 5/2000 | Guyot et al. | ............. | 379/93.01 |
| 6,324,394 B1 | * 11/2001 | Vazvan | ....................... | 455/406 |

* cited by examiner

*Primary Examiner*—Nick Corsaro
*Assistant Examiner*—Tu Nguyen
(74) *Attorney, Agent, or Firm*—Scott M. Garrett

(57) ABSTRACT

A method for automatically entering a SIM's PIN in case of a reset or other condition includes the steps of storing (206) in RAM the PIN after it has been verified (204). Whenever a reset condition occurs, the PIN that is cached in RAM (106) is automatically presented to the SIM (214). In order to make sure that the PIN stored in RAM (106) in not corrupted during a reset condition, the inverse (208) or other coded form of the PIN is also stored in RAM (106) as an additional check of the correctness of the stored PIN.

9 Claims, 3 Drawing Sheets

METHOD FOR PROVIDING A PERSONAL IDENTIFICATION NUMBER TO A SUBSCRIBER IDENTITY MODULE

TECHNICAL FIELD

This invention relates in general to electronic devices, and more particularly to a method of providing a personal identification number (PIN) to an electronic device having a subscriber identity module (SIM).

BACKGROUND

A wide variety of electronic devices use a removable memory card having information stored therein. One such electronic device is an iDEN™ 2000 radiotelephone manufactured by Motorola, Inc. of Schaumburg, Ill. The iDENT™ 2000 radiotelephone is a dual-mode handset that operates in the Global System for Mobile Communications (GSM) 900 MHz frequency range, as well as in Motorola's iDEN integrated digital networks. The i2000 radiotelephone like many other communication devices includes a subscriber identity module (SIM) which is also referred to as a smart card. The SIM holds a wide variety of important data including for example, a SIM serial number, international mobile subscriber identity (IMSI) which identifies the radio subscriber, etc. Given the sensitive nature of the data stored in the SIM card, a personal identification number (PIN) that is stored in the SIM, or derived by the SIM from information stored in the SIM is required to be entered in the electronic device at certain times in order for the data stored in the SIM to be accessed.

Whenever a software or other error condition occurs, a radiotelephone will typically be reset automatically. However, when the radiotelephone is reset the SIM is also reset, so the user is required to reenter the PIN number of the SIM or the SIM will not allow information stored therein to be accessed by the radiotelephone. This requirement of having to reenter the PIN is, of course, done in order to protect the highly sensitive information stored in the SIM.

Many times, however, the radiotelephone user is not looking at the radiotelephone and does not realize that the radiotelephone has reset and that the SIM's PIN has to be reentered. Until the SIM's PIN is entered the user will not be able to receive any incoming phone or dispatch calls. This condition can be very annoying to some radio users and is very critical for radio users such as police and fire departments who need to monitor for emergency situations.

Another problem that currently occurs with the SIM's PIN is that when a radiotelephone that is capable of operating in more than one communication protocol (e.g., iDEN and GSM) changes protocols, the radio user has to reenter the SIM's PIN. This is time consuming for the radio user and is another thing a user has to remember to accomplish. Given the above, a need exists in the art for a method of providing a PIN to a SIM in order to help alleviate some of the above mentioned problems.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
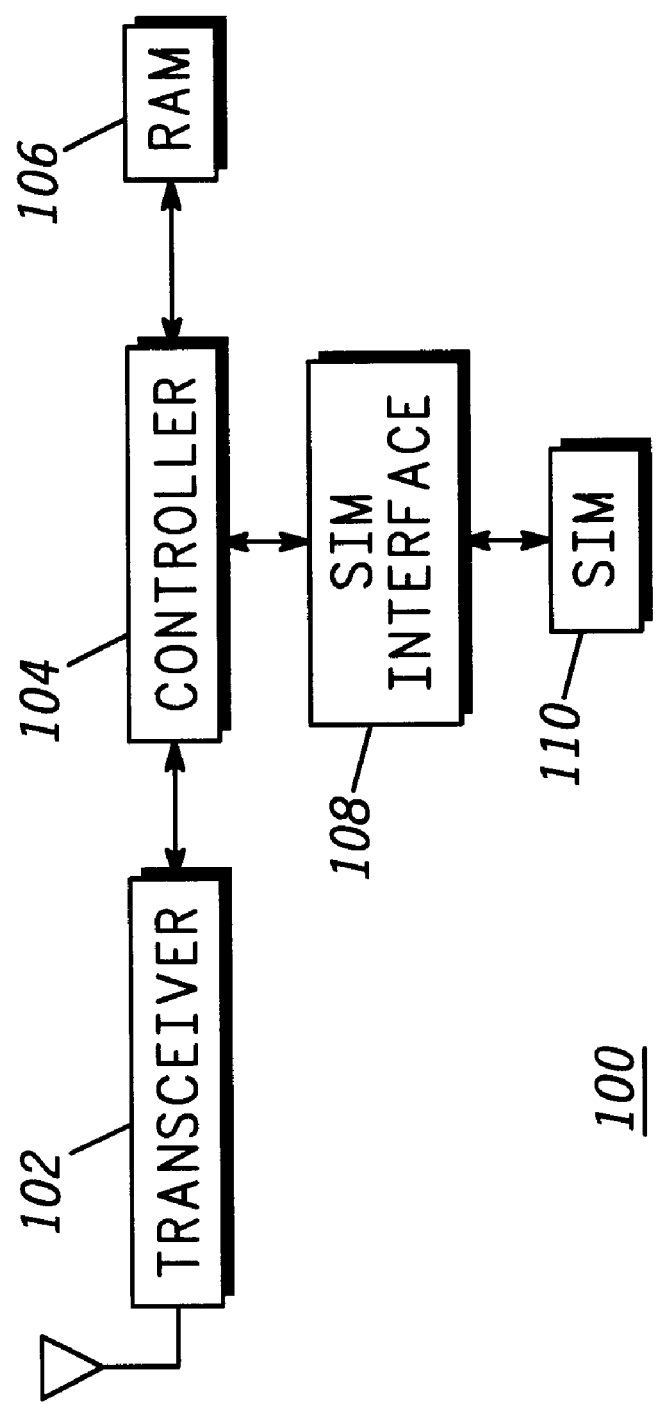
FIG. 1 shows a block diagram of an electronic device in accordance with the present invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1 there is shown a simplified block diagram of an electronic device such as a radiotelephone 100 in accordance with the present invention. Radiotelephone 100 includes a conventional radio frequency transceiver 102. The radiotelephone 100 is under the control of a controller 104 such as a conventional microcontroller, microprocessor or other control circuitry. Controller 104 can include built-in read-only memory (ROM), electrically programmable read-only memory (EEPROM). Random access memory (RAM) 106 is coupled to controller 104 and provides for memory storage of program parameters, etc.

A SIM interface 108 couples a removable SIM 110 to controller 104. In accordance with the present invention, the SIM's personal identification number (PIN) is stored in a special section within RAM 106. The memory location wherein the SIM's PIN is stored is volatile and is cleared whenever the radiotelephone 100 is powered off. However, this memory location is not cleared or modified by any normal memory tests or memory initializations performed by controller 104 after a reset.

Figure 2:
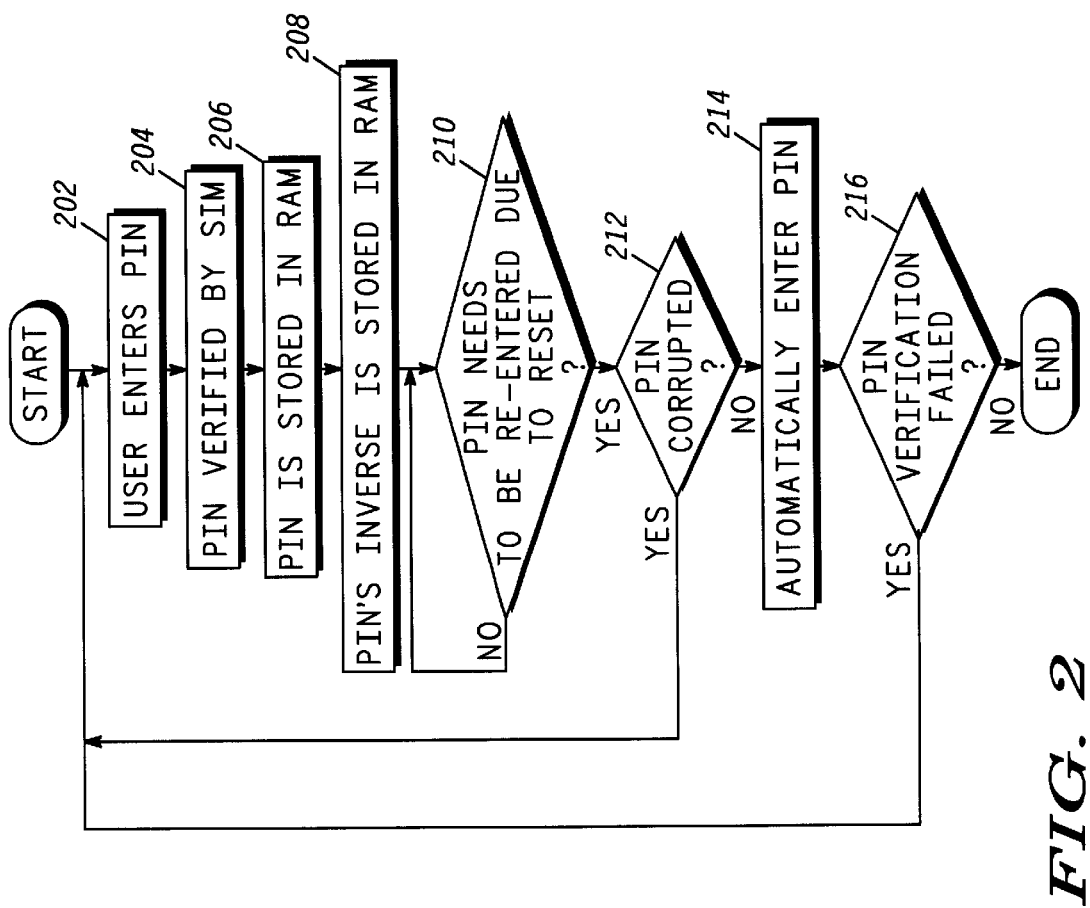
FIG. 2 shows a flow diagram illustrating the operation of an electronic device in accordance with the present invention.

In FIG. 2, there is shown a simplified flowchart highlighting the steps taken in accordance with the present invention. In step 202, the radio user enters the SIM's PIN. The entered PIN is verified by the SIM 110 according to well known SIM verification routines in step 204. Once the PIN is verified, the PIN is stored in a special section in RAM 106. Optionally, in order to provide further integrity to the PIN storage a coded version of the PIN is also stored. In the preferred embodiment, the bit wide inverse of the PIN is stored in RAM 104 in step 208. Other different coding techniques could be used, including performing coded conversions of the PIN, etc.

In step 210 it is determined if the PIN needs to be reentered due to a reset of radiotelephone 100. If the PIN is determined to be in need of reentering, in step 212 it is first determined if the PIN stored in RAM 106 has been corrupted due to the reset condition. This is done by comparing the stored PIN with its stored inverse. If it is determined that the stored PIN has not been corrupted, in step 214 the PIN is automatically entered then and verified at step 216 with the PIN stored in SIM 110. This is all done transparently from the user.

Figure 3:
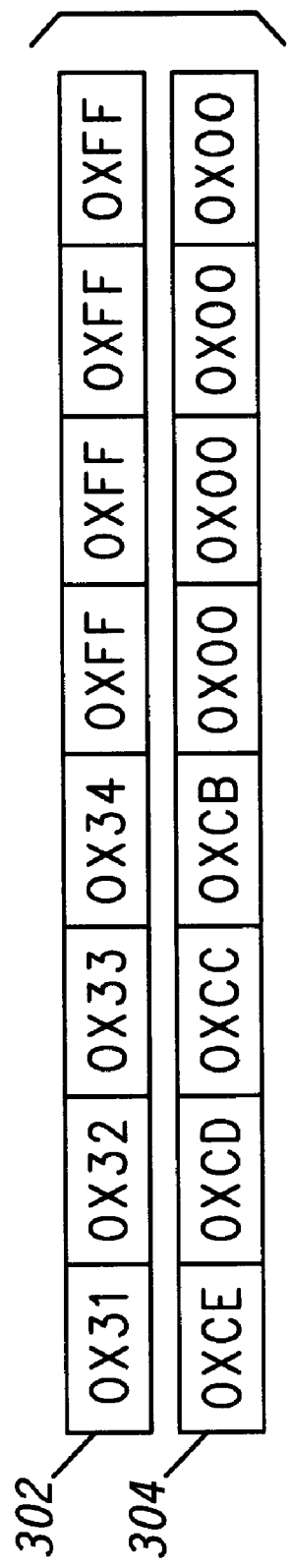
FIG. 3 shows a diagram of memory locations having a PIN and the PIN's inverse stored therein in accordance with the present invention.

If in step 212, it is determined that the stored PIN has been corrupted due to it not matching with its stored inverse (coded PIN) after the PIN's inverse is recalculated from the stored PIN, the routine returns to step 202 and the radio user needs to manually reenter the PIN. If in step 216 the PIN verification performed by SIM 110 fails, the radio user has to reenter the PIN; however, if the verification at step 216 is successful, then the stored PIN has been automatically reentered and verified with the SIM, without any intervention by the radio user and the process ends. When the radiotelephone 100 is powered off, the cached copy of the SIM's PIN is cleared from memory. The next time the radiotelephone is powered on the radio user will need to enter the SIM PIN to gain access for security reasons. The software that accomplishes the above steps is executed by controller 104 and stored in memory that is accessible to the controller. In FIG. 3, there is shown a RAM memory location holding a sample PIN 302, in this particular example, the PIN is "1234". The inverse of the PIN is stored in second memory location 304. As mentioned previously, the PIN and PIN's inverse are stored in a section of RAM 106.

The method of the present invention can be used with any electronic product that uses a SIM or smart card, such as cellular phones, computers, satellite receivers/descramblers, etc. The present invention saves time in a reset or a mode change condition (e.g., GSM to iDEN), where in the past, the electronic device user had to manually enter the PIN. With the present invention the PIN is automatically entered transparently to the user, and optionally, the PIN is checked to make sure it has not been corrupted prior to presenting it to the SIM 110 for verification. The SIM PIN caching of the present invention provides a safe and effective technique for providing a PIN to a SIM or smart card. In power up conditions, the cached PIN is cleared, in order to protect the sensitive PIN information.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for providing a personal identification number (PIN) to a subscriber identification module (SIM) used in an electronic device having a volatile memory storage area, the volatile memory storage area having a section that is not cleared by an occurrence of a reset condition, comprising the steps of:

(a) entering the PIN for verification by the SIM;

(b) storing a copy of the PIN in the volatile memory storage area that is not cleared by the occurrence of a reset condition; and (c) presenting automatically the stored copy of the PIN to the SIM when a reset condition causes the PIN to be required to be reentered.

2. A method as defined in claim 1, wherein the volatile memory storage area comprises random access memory (RAM).

3. A method as defined in claim 1, further comprising after step (b) the steps of:

(b1) calculating a coded form of the PIN; and (b2) storing a copy of the coded form of the PIN in the volatile memory storage area.

4. A method as defined in claim 1, wherein step (c) is performed transparently from the user of the electronic device.

5. A method as defined in claim 1, wherein step (b) is performed only after the PIN entered in step (a) has been verified successfully by the SIM.

6. A method as defined in claim 3, further comprising the step of:

(b3) verifying the PIN stored in step (b) with the coded form of the PIN stored in step (b2) prior to performing step (c).

7. A method as defined in claim 3, wherein step (b1) comprises calculating the bit wide inverse of the PIN.

8. A method as defined in claim 1, wherein the copy of the PIN stored in step (b) is cleared if the electronic device is powered off.

9. A method as defined in claim 6, wherein if in step (b3) the stored PIN does not match the coded PIN after the stored PIN is converted into the coded form, the PIN has to be reentered by the user of the electronic device.

* * * * *